US012688315B2

(12) United States Patent
Marseille et al.

(10) Patent No.: US 12,688,315 B2
(45) Date of Patent: **\*Jul. 21, 2026**

(54) METHOD TO STORE DATA PERSISTENTLY BY A SOFTWARE PAYLOAD

(71) Applicants: THALES DIS FRANCE SAS, Meudon (FR); THALES, Meudon (FR)

(72) Inventors: François-Xavier Marseille, Marly le Roi (FR); Fadela Letourneur, Maurepas (FR); Frédéric Ruget, Nanterre (FR)

( * ) Notice: Subject to any disclaimer, the term of this patent is extended or adjusted under 35 U.S.C. 154(b) by 17 days.

This patent is subject to a terminal disclaimer.

(21) Appl. No.: 18/705,674

(22) PCT Filed: Oct. 28, 2022

(86) PCT No.: PCT/EP2022/080250
§ 371 (c)(1),
(2) Date: Apr. 29, 2024

(87) PCT Pub. No.: WO2023/073198
PCT Pub. Date: May 4, 2023

(65) Prior Publication Data
US 2025/0013737 A1 Jan. 9, 2025

(30) Foreign Application Priority Data

Oct. 29, 2021 (EP) ..................................... 21306534

(51) Int. Cl.
*G06F 21/62* (2013.01)
*G06F 21/53* (2013.01)
(Continued)

(52) U.S. Cl.
CPC .......... *G06F 21/6209* (2013.01); *G06F 21/53* (2013.01); *G06F 21/57* (2013.01);
(Continued)

(58) Field of Classification Search
CPC ........ G06F 21/53; G06F 21/57; G06F 21/602; G06F 21/6209; H04L 9/0861; H04L 9/14;
(Continued)

(56) References Cited

U.S. PATENT DOCUMENTS

| 10,423,774 | B1 * | 9/2019 | Zelenov | ................ | H04L 63/126 |
| 11,475,140 | B1 * | 10/2022 | Buonora | ............... | G06F 21/602 |

(Continued)

OTHER PUBLICATIONS

International Search Report (PCT/ISA/210) and Written Opinion (PCT/ISA/237) mailed on Feb. 7, 2023, by the European Patent Office as the International Searching Authority for current International Application No. PCT/EP2022/080250—[13 pages].

*Primary Examiner* — Shaqueal D Wade-Wright

(57) ABSTRACT

A method to store data persistently by a payload of an owner, the method including establishing a secure channel between the owner and the software payload itself when running into a hardware-based trusted executed environment, HW TEE, at the instance of a cloud service provider; generating, by the owner, a payload identifier using information shared from the payload during the establishment of the secure channel; generating, by the owner, a key initiator and persistently storing at the owner side the key initiator associated to the payload identifier; sending, by the owner, the payload identifier and the key initiator to the payload; using the key initiator, by the payload, to encrypt data; and persistently storing, by the payload, the encrypted data and the payload identifier.

9 Claims, 5 Drawing Sheets

(51) Int. Cl.

| | | |
|---|---|---|
| *G06F 21/57* | (2013.01) | |
| *G06F 21/60* | (2013.01) | |
| *H04L 9/08* | (2006.01) | |
| *H04L 9/40* | (2022.01) | |
| *H04L 9/32* | (2006.01) | |

(52) U.S. Cl.

CPC ........ *G06F 21/602* (2013.01); *G06F 21/6218* (2013.01); *H04L 9/0861* (2013.01); *H04L 63/06* (2013.01); *H04L 9/3263* (2013.01)

(58) Field of Classification Search

CPC ....... H04L 9/32; H04L 9/3263; H04L 9/3247; H04L 9/321; H04L 9/08; H04L 9/0844; H04L 9/0877; H04L 9/0841; H04L 63/06

See application file for complete search history.

(56) References Cited

U.S. PATENT DOCUMENTS

| | | | |
|---|---|---|---|
| 2018/0096137 A1* | 4/2018 | Trostle ................... | G06F 21/53 |
| 2018/0183578 A1 | 6/2018 | Chakrabarti et al. | |
| 2018/0211067 A1 | 7/2018 | Costa | |
| 2019/0243963 A1* | 8/2019 | Soriente ............... | H04L 9/3247 |
| 2019/0362083 A1* | 11/2019 | Ortiz ...................... | G06N 20/00 |
| 2021/0037001 A1 | 2/2021 | Sapek et al. | |
| 2023/0131060 A1* | 4/2023 | Ko ........................ | H04L 9/3213 |
| | | | 713/151 |
| 2024/0320308 A1* | 9/2024 | Hwang ................... | G06F 21/14 |

* cited by examiner

METHOD TO STORE DATA PERSISTENTLY BY A SOFTWARE PAYLOAD

FIELD OF USE

The present invention relates to the technical field of data protection and, namely, to the field of confidential computing extending the capabilities of data protection in-use to data at rest.

More particularly, the present invention provides sealing capabilities to a payload running into a hardware-based trusted execution environment at the instance of a cloud service provider, CSP, in order to ensure the confidentiality of its persistent storage. "Data sealing" may thus be understood as the capability to store persistent data in a manner that only the original payload—or a set of authorized payload(s)—are able to retrieve it.

Accordingly, if this payload is either modified or the HW TEE is modified/tampered-with, the present invention ensures that the payload will not be able to retrieve its persistent storage protected by the sealing capability.

More importantly, this sealing capability does not rely on ad hoc HW TEE mechanisms of a specific CSP but provides a multi-CSP and interoperable solution.

BACKGROUND

In today's computing, data may exist in three different states: in transit (i.e., data traversing untrusted public or private networks), at rest (i.e., inactive data in storage), and in use (i.e., data being processed while in memory and during computation). Since cryptographic techniques to protect data in transit and at rest have been constantly enhanced and widely deployed thus thwarting threat vectors against network and storage devices, attackers have recently shifted to targeting data-in-use.

As more data is moved to the cloud, mobile, or IoT devices—where processing takes place in remote and difficult to secure locations—the protection of data and applications during execution is increasingly important.

Confidential computing thus provides a solution for protecting data in use by using hardware-based Trusted Execution Environments (henceforth "HW TEE"). A Trusted Execution Environment (TEE) is a secure area of a processor that assures data integrity, data confidentiality, and code integrity. The hardware-based TEE uses hardware-backed techniques to provide increased security guarantees for the execution of code and protection of data within that environment.

HW TEE basically provides security though the lowest layer of hardware, down to the silicon components, with a minimum of dependencies, by removing the operating system, device driver and peripheral vendors from the list of required trusted parties, thereby reducing exposure to potential compromise. Examples of HW TEE chip providers are Intel with Software Guard Extensions (Intel SGX), or AMD with Secure Encrypted Virtualization (SEV-SNP).

Service providers or cloud service providers such as Amazon@ Web Services (AWS), Google® Cloud Platform (GCP), Microsoft® Azure (Azure), OVHCIod™, or AlibabaCloud$^7$M normally comprise one or several HW TEE in their infrastructure in order to offer to their customers the means to use confidential computing for their payload(s). These customers (henceforth "owners") own piece(s) of computing resources e.g., code or data (henceforth "payload") that wishes to execute in the CSP infrastructure.

Nevertheless, confidential computing services are not coming as a simple turnkey solution, especially for going beyond basic security properties. One of these basic security properties is known as remote attestation or simply "attestation", that is, a mechanism to provide a verifiable signature of the running payload provided by the HW TEE and to be verified by either the owner or a 3rd party of trust. This type of evidence must be signed by hardware that can be vouched for by a manufacturer (e.g., Intel® or AMD®), so that the party checking the evidence has some assurance that it was not generated by malware or other unauthorized parties.

However, HW TEE from different vendors have their own attestation mechanisms (i.e., different technically implemented mechanisms), that are not interoperable among them and only share a minimum set of security features for the attestation verification. Indeed, all HW TEE default attestation mechanisms ensure that the HW TEE is genuine and the payload is the expected one (measurement signature indicating that it was not modified) further being able to inform about its current state in the execution. Furthermore, in order to prevent replay attacks against the attestation, the attestation mechanism may involve a nonce sent from the user.

In addition to these basic security features, there is no built-in mean to guarantee that any subsequent communication from the owner will occur with the same attested payload (and not a modified one). For instance, if the owner wishes to provision some secret(s) to that payload, he/she will be uncertain if the very same payload is being provisioned with these secret(s) if the attestation was already performed.

In addition, some use cases requires contacting the payload at different periods of time which is currently solved by performing several attestations of the payload at those instances. Nevertheless, there is a strong limitation nowadays in existing HW TEE due to the absence of confidentiality of payload at-rest, meaning that it is not possible for the payload to ensure the identity of the owner during these re-attestations. In consequence, since there is no confidentiality by default for the payload itself, keys cannot be stored elsewhere (e.g., in binary as data blob) at CSP's side to protect the persistent storage.

Finally, each HW TEE from a different vendor has different capabilities in terms of secure persistent storage or data sealing. For instance, a few HW TEE technologies (such as Intel SGX) natively support persistent storage by allowing the payload to generate a key that is specific to both itself and the given HW TEE. Therefore, this native mechanism suffers from some limitations in term of flexibility and scalability.

Still, once one specific provisioning has been done, it is critical to ensure that the same owner performs the following attestations.

Thus, there is a need in the confidential computing industry for an interoperable solution that allows the payload having persistent storage for supporting non-stateless use cases.

SUMMARY

The present invention provides a solution for the aforementioned problems by a method for storing data persistently by a payload of an owner according to claim 1, a method for retrieving this persistently stored data according to claim 5, a related system according to claim 9, an owner according to claim 10, and a software payload according to claim 11. In dependent claims, preferred embodiments of the invention are defined.

In a first inventive aspect, the invention provides a computer-implemented method to store data persistently by a payload of an owner, the method comprising the following steps:

establishing a secure channel between the owner and the software payload itself when running into a hardware-based trusted execution environment, HW TEE, at the instance of a cloud service provider;

generating, by the owner, a payload identifier using information shared from the payload during the establishment of the secure channel;

generating, by the owner, a key initiator and persistently storing at the owner side the key initiator associated to the payload identifier;

sending, by the owner, the payload identifier and the key initiator to the payload;

using the key initiator, by the payload, to encrypt data; and persistently storing, by the payload, the encrypted data and the payload identifier.

As noted, once the secure channel has been established between the owner and the software payload, all subsequent communications will occur through this secured channel.

In addition, in order to improve security, the payload does not store the key initiator or, in order words, once used, the payload will delete key initiator and any derived key as will be described later on. Therefore, in a preferred embodiment, after used, the payload deletes the key initiator and any derived key such as encryption key(s) and integrity key(s). Accordingly, only the owner will store the key initiator in an associated manner to the payload identifier.

Thus, when the payload has to access the stored data, it retrieves first its payload identifier (or a ciphered form thereof) that may also contain information about the version of the software payload running for distinguishing purposes among different versions. For instance, for use cases of data migration as the running software will be also changing accordingly.

In a further implementation, the owner may wish to have payloads sharing the same sealing keys (e.g., key initiator itself or derived keys therefrom) in order to address scalability in case, for instance, that an application needs to have several instances of the same payload and want to access the same database(s). Thus, sharing these sealing keys will simplify the process.

In another use case, an owner may wish to support multi-tenants so, in this case, sharing keys might affect security and hence each payload should use its own key initiator.

Accordingly, the idea underlying the invention is that by introducing the payload identifier, the owner is allowed to identify and retrieve the correct key initiator for sending it to the proper payload.

How this payload identifier is generated may change depending on the use case. For instance, when the Virtual Machine (VM) is instantiated for the first time to a specific customer (i.e., the CSP or HW TEE will identify that is addressing a specific customer because of the lunching of the VM), it is possible at that time to perform this association. To ensure this very same association for a re-starting of the VM, the (ciphered) identifier is sent to the payload for its storing.

In a particular embodiment, the owner encrypts the payload identifier using a first encryption key (e.g., a symmetric key) before sending it to the payload for its persistent storing in encrypted form.

Advantageously, the payload is configured to store it in ciphered form and only the owner is configured to decipher it as it possess the first encryption key. In addition, security is increased, as the identifier does not appear in clear at the payload side. This first encryption key is normally used for all (or a group of) the payloads of the owner, while the key initiator is preferably personalized per payload identifier.

In an embodiment, once the payload stores the ciphered payload identifier, the next time stored data needs to be unsealed, the owner sends (through the secure channel established) the encryption key to allow deciphering the identifier and, then, this identifier is sent back to the owner. From this point, the owner is able to check whether that identifier was indeed previously stored at its end and, if so, retrieve the associated key initiator and send it to the payload.

Advantageously, no keys are stored at the CSP side for persistent storage or data sealing but only the material needed to generate these keys. The real keys are kept by the owner and only distributed on demand and, more importantly, only through a direct secure channel. In a basic embodiment, the key initiator is a symmetric key. Alternatively, in a preferred embodiment, the key initiator is first passed through a key derivation function, KDF, by the payload, to generate a symmetric key that encrypts the data.

The invention thus allows providing data sealing capabilities to payload running on a HW TEE that does not support it by default. In addition, these data sealing capabilities are independent from the HW TEE vendor which has a major advantage in case the HW TEE is broken, thus still ensuring the confidentially of the data at rest. Finally, by using different identifiers (or, otherwise, the same identifier) that may be grouped for different payloads or even share common key initiators, finer granularity is achieved and policies are thus under the control of the owner.

Furthermore, if the payload runs into a HW TEE having native data sealing capabilities, the owner may be configured to revoke permissions for the payload to access to the sealed data. That is, the payload identifier is protected with the sealing capabilities of the HW TEE, then it will still be used by the owner to eventually send the key initiator as disclosed above. Advantageously, this improves the default data sealing capabilities of some HW TEE that are not supporting such revocation mechanism since the payload can only access the key initiator if the owner agrees (i.e., if it sends the key initiator).

In a preferred embodiment, the key initiator is passed through a key derivation function, KDF, by the payload, to generate a Message Authentication Code (MAC) that allows the payload to subsequently check the integrity of the persistently stored data.

Finally, even if the secure channel may be established in different ways, in the following it will be explained a preferred multi-CSP embodiment of the invention.

In this preferred embodiment, the secure channel between the owner and the software payload is backed by the computation, by the HW TEE, of an attestation. Therefore, in this embodiment, the payload identifier is derived from the attestation information such as information relative to the HW TEE (e.g., firmware), the version of the payload, and/or the instantiation of the payload.

For instance, this secure channel backed by attestation may be established as follows:

sending, by the owner, at least a nonce to the software payload;

generating, by the software payload, a payload key pair: public key and private key;

mixing, by the software payload, the payload public key with the nonce;

computing, by the HW TEE, an attestation using at least this nonce mixed with the payload public key;

sending, by the software payload, at least the attestation, and the payload public key to the owner;

verifying, by the owner, the attestation using the sent nonce mixed with the received payload public key;

generating, by the software payload and the owner, a session key between them; and establishing a secure channel between the owner and the software payload running into the HW TEE.

Throughout the following description, a nonce will be understood as a data string generated at the owner side (either by the owner's device or by another interconnected device) to be used only once in a cryptographic communication. The nonce may be either a random or a pseudo-random number, or also contain blocks of different information such as a timestamp or identifiers (owner's, payload's, HW TEE's, etc.). Nevertheless, the skilled person shall recognize that the actual format, size and other informative data sent in the nonce is specific to the technology of the HW TEE vendor.

Then, in a typical attestation process, once the owner provides the payload with the nonce, it is passed through the HW TEE as part of the traditional attestation process on the HW TEE side. In other words, the nonce becomes part of the data signed by the HW TEE and, therefore, if the owner is able to verify the attestation it means that the same nonce was used. This embodiment, on the contrary, mixes with this nonce other data generated by the payload to be also signed by the HW TEE. In a preferred embodiment, the payload generates an ECDSA key pair (payload private key, payload public key).

Consequently, if the owner also knows this payload public key, it will be able to perform the same mixing operation and by verifying the attestation, it will be sure that this key pair was generated by (or inside) the payload running under confidential computing and further signed by the HW TEE.

Once the secure channel is established in this way, the owner is certain that can inject or provision some secret(s) in the very same attested payload without being exposed. For instance, at this point, the owner can send the payload identifier and the key initiator to the payload.

Therefore, the owner may start generating the payload identifier before the secure channel is established with some authenticated previous information but will only send the payload identifier and the key initiator once it is fully established. In addition, the key initiator may be generated on the fly or pertain to a container of pre-generated key initiator(s) and be late associated with the payload identifier.

As the skilled person knows, the session key (shared secret) between the parties (owner and payload) may be generated based on different key-agreement protocols such as any public key-based key-agreement protocol. In a preferred embodiment, the non-authenticated key-agreement protocol is based on an Elliptic Curve Diffie-Hellman, ECDH, protocol.

In a second inventive aspect, the invention provides a computer-implemented method to retrieve data persistently stored by a payload of an owner according to any of the embodiments of the first inventive aspect, the method comprising the following steps:

having established or re-establishing a secure channel between the owner and the software payload itself when running into the HW TEE at the instance of a cloud service provider;

retrieving, by the payload, the stored payload identifier and sending it to the owner;

retrieving, by the owner, the key initiator associated to the received payload identifier;

sending, by the owner, the key initiator to the payload; and using the key initiator, by the payload, to decrypt the persistently stored data.

In a particular embodiment, the stored payload identifier had been previously encrypted by the owner using the first encryption key, the method comprising the following steps:

sending, by the owner, the first encryption key to the payload; and after being retrieved, decrypting, by the payload, the payload identifier and sending it to the owner.

In a particular embodiment, the stored payload identifier had been previously encrypted by the owner using the first encryption key, the method comprising the following steps:

sending, by the payload, the encrypted payload identifier to the owner;

decrypting, by the owner, the payload identifier; and retrieving, by the owner, the key initiator associated to the decrypted payload identifier.

In a third inventive aspect, the invention provides a system for persistently storing data by a software payload of an owner, the system comprising:

the owner of the software payload configured to send the software payload to the HW TEE for its execution, the software payload configured to run into the HW TEE, and the HW TEE operated by a cloud service provider;

wherein the owner of the software payload and the software payload itself are configured to establish a secure channel between them when the payload is running into the HW TEE at the instance of the cloud service provider;

the owner is further configured to generate a payload identifier using information shared from the payload during the establishment of the secure channel;

generate a key initiator;

persistently store at the owner side the key initiator associated to the payload identifier; and send the payload identifier and the key initiator to the payload;

wherein the payload if further configured to use the key initiator to encrypt data; and persistently store the encrypted data and the payload identifier.

In a fourth inventive aspect, the invention provides an owner of a software payload for persistently storing data by the software payload, the owner of the software payload configured to send the software payload to the HW TEE for its execution, wherein the owner is further configured to establish a secure channel with the payload when the latter is running into the HW TEE at the instance of the cloud service provider;

generate a payload identifier using information shared from the payload during the establishment of the secure channel;

generate a key initiator;

persistently store at the owner side the key initiator associated to the payload identifier; and send the payload identifier and the key initiator to the payload which will use the key initiator to encrypt data and persistently store it and the payload identifier.

In a fifth inventive aspect, the invention provides a software payload of an owner for persistently storing data, the software payload being configured to run into the HW TEE, wherein the payload if further configured to:

receive a payload identifier and a key initiator from the owner;

use the key initiator to encrypt the data; and persistently store the encrypted data and the payload identifier.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION

As it will be appreciated by one skilled in the art, aspects of the present invention may be embodied as a method or a system for storing data, a method to retrieve said data, an owner, or a software payload.

Herein below, it is considered a case in which the method according to the invention for establishing a secure channel or persistently store data is implemented by, locally at a server side, an HW TEE at instances or premises of a cloud service provider.

According to another embodiment, the owner is implemented by a PC 1, and may also be a SE host device that cooperates with a TEE that is adapted to carry out the functions that are carried out by the owner.

The invention does not impose any constraint as to a kind of the owner's device (so-called "owner") or cloud server provider's HW TEE. Examples of owner devices or simply owner can be a mobile phone, a server, an IoT device, etc.

Figure 1:
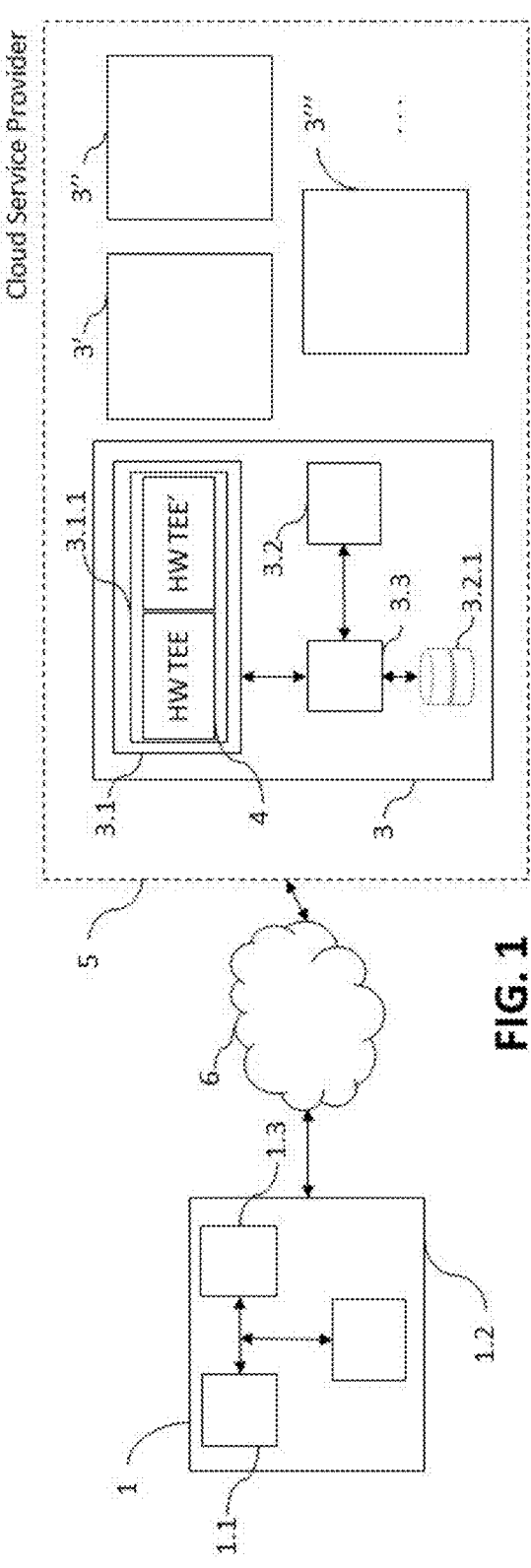
FIG. 1 This figure shows an embodiment of a system according to the invention comprising an owner, and a payload running into a HW TEE.

FIG. 1 depicts schematically a system of an owner, as a PC 1, and a software payload 2 running into a HW TEE 4 at the instance of a cloud service provider 5.

The PC 1 may be configured to receive, from a user at least his/her login credentials for at least one of his/her end-user account(s), verify them and let said user to run applications and/or initiate different processes such as sending a code as a whole or part (i.e., "trusted portion") of an application, i.e., the payload 2, to be executed in the HW TEE.

Therefore, the PC 1 (or the server) includes one or several (micro)processors (and/or a (micro)controller(s)) 1.1, as data processing means, comprising and/or being connected to one or several memories 1.2, as data storing means, comprising or being connected to means for interfacing with the user, such as a Man Machine Interface (or MMI), and comprising or being connected to an Input/Output (or I/O) interface(s) 1.3 that are internally all connected, through an internal bidirectional data bus.

The I/O interface(s) 1.3 may include a wired and/or a wireless interface, to exchange, over a contact and/or Contactless (or CTL) link(s), with a user. Within the present description, the adjective "CTL" denotes notably that the communication means communicates via one or several Short Range (or SR) type Radio Frequency (or RF) links.

Alternatively, instead of a CTL link(s), or additionally, the PC 1 is connected, through a wire(s) or a cable(s) (not represented), to another end-user terminal or device (not represented) also operated at the owner's instances for instance, at the owner's facilities. That is, the owner may be also embodied as a server device configured to execute data/code, optionally split it into trusted and untrusted portions, and send the trusted portions to a CSP's HW TEE for its execution. Examples of payloads as highly sensitive data that must be protected and securely processed is personally identifiable information (PII), healthcare, financial, or intellectual property data.

The PC MMI may include a display screen(s), a keyboard (s), a loudspeaker(s) and/or a camera(s) (not represented). The PC MMI allows the user to interact with the PC 1. The PC MMI may be used for getting data entered and/or provided by the user.

The PC memory(ies) 1.2 may include one or several volatile memories and/or one or several non-volatile memories. The PC memory(ies) 1.2 may store data, such as an ID(s) relating to the PC, that allows identifying uniquely and addressing the PC. The PC ID(s) may include a unique ID, such as a UUID, a Uniform Resource Locator (or URL), a Uniform Resource ID (or URI), and/or other data that allows identifying uniquely and addressing the PC.

The PC memory(ies) 1.2 stores the Operating System (OS) and an application which is adapted to send the payload (also known as "workload") to the CSP to be processed within one of the HW TEE. The owner's application that allows sending this payload may be a web-based portal (e.g., Amazon Web Service, AWS, management console), or even an open source application (e.g., AWS command line interface).

The PC 1 itself, or in combination with a server, is further configured to send information over a communication network 6 (e.g., Transport Layer Security, TLS) to the CSP end. In particular, the owner 1 and the cloud service provider infrastructure 5 may communicate via one or more Application Program Interfaces, APIs, using HTTPS over TLS.

At the CSP end 5, or CSP facilities, one or more computing devices 3, 3', 3", 3'" with one or more HW TEEs 4, 4' are provided as secure enclave(s) for confidential computing services.

As shown in FIG. 1, the computing device 3 includes a processor 3.1, a memory 3.2, and an I/O subsystem 3.3, and a data storage device 3.2.1. Examples of computing devices 3 suitable for confidential computing are those described in US 2021/0117246 A1 in relation with secure enclave supports such as Intel@Software Guard Extensions (SGX) technology.

Thus, the processor 3.1 may be embodied as a single or multi-core processor(s), digital signal processor, microcontroller, or other processor or processing/controlling circuit including the secure enclave support 3.1.1, which allows the processor 3.1 to establish a trusted execution environment 4 known as a secure enclave, in which executing code (i.e., payload) may be measured, verified, and/or otherwise determined to be authentic.

Additionally, code and data included in the secure enclave may be encrypted or otherwise protected from being accessed by code executing outside of the secure enclave. For example, code and data included in the secure enclave may be protected by hardware protection mechanisms of the processor 3.1 while being executed or while being stored in certain protected cache memory of the processor 3.1. The secure enclave support 3.1.1 may be embodied as a set of processor instruction extensions that allows the processor 3.1 to establish one or more secure enclaves in the memory 3.2.

The memory 3.2 may be embodied as any type of volatile or non-volatile memory or data storage capable of performing the functions described herein. In operation, the memory 3.2 may store various data and software used during operation of the computing device 3 such as operating systems, applications, programs, libraries, and drivers. As shown, the memory 3.2 may be communicatively coupled to the processor 3.1 via the I/O subsystem 3.3, which may be embodied as circuitry and/or components to facilitate input/output operations with the processor 3.1, the memory 3.2, and other components (not shown) of the computing device 3.

The data storage device 3.2.1 may be embodied as any type of device or devices configured for short-term or long-term storage (i.e., persistent storage) of data such as, for example, memory devices and circuits, memory cards, hard disk drives, solid-state drives, non-volatile flash memory, or other data storage devices. The secure enclave platform 3.1.1 may have native mechanisms for sealing or persistently storing pre-encrypted data and native standard key exchange to setup an encrypted tunnel for data transport between components of the computing device 3 (for instance, for local attestation purposes).

In this illustrative embodiment, the components of the computing device 3, or the secure enclave platform 3.1.1 itself, additionally comprise hardware attestation features to prove their authenticity. The root of trust in the computing device 3 manages the security credentials (keys, certificates) used with this purpose. As mentioned, the attestation process measures code and data of the running payload, for instance when it is starting up, and attests it when the owner requests attestation.

Figure 2:
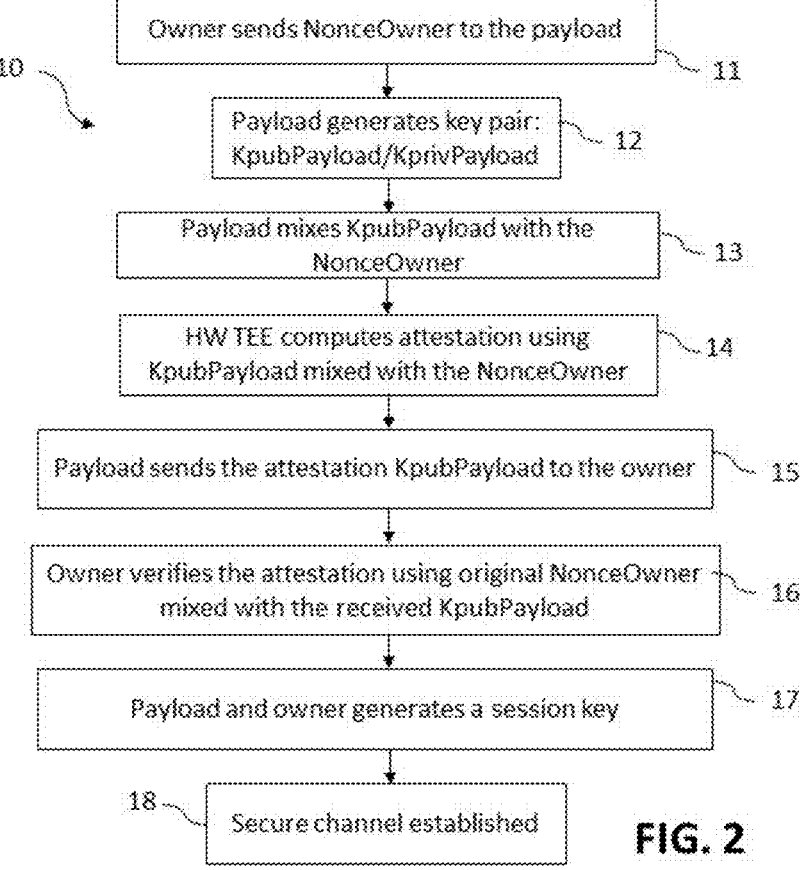
FIG. 2 This figure shows a schematic flowchart of an method to establish a secure channel between the owner of a software payload and the software payload itself when running into a HW TEE at the instance of a cloud service provider.

FIG. 2 depicts a schematic flowchart of a method 10 to establish a secure channel between the owner 1 of a software payload 2 and the software payload 2 itself. For this, it will be assumed that the owner 1 already sent the payload 2 to the CSP 5 and it is running into a HW TEE 4 described in FIG. 1.

Method 10 comprises the following steps: first, the owner 1 generates and sends 11 at least a nonce (NonceOwner) to the software payload 2. Then, the payload 2 generates 12 a payload key pair: public key (KpubPayload) and private key (KprivPayload). The payload mixes 13 the KpubPayload with NonceOwner as a "modified" nonce (AttestationNonce) to be provided to the HW TEE. That is, payload 2 will provide the HW TEE 4 with the AttestationNonce for computing the attestation instead of the original NonceOwner generated by the owner.

After, HW TEE 4 computes 14 an attestation (AttestationPayloadReport) using at least this AttestationNonce. AttestationPayloadReport will be retrieved by the payload 2 and forwarded 15 to the owner with the KpubPayload.

Once received by the owner 1, it reproduces the same mixing done by the payload but instead using the nonce it originally sent (i.e., NonceOwner). Therefore, if the mixing output is the same, it is certain that no attack occurred. Therefore, the owner 1 can verify 16 that it is the same data it originally sent. Finally, the payload 2 and the owner 1 generates 17 a session key and thus establish 18 a secure channel between them.

Figure 3:
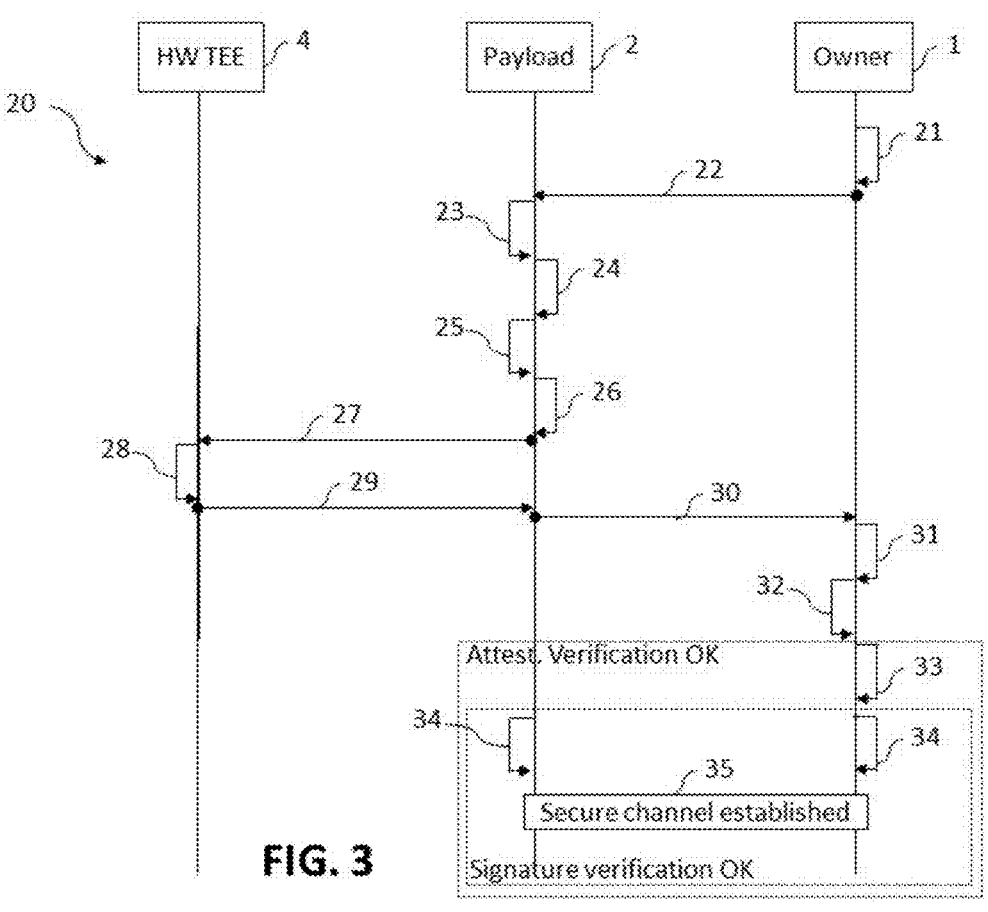
FIG. 3 This figure shows a schematic diagram of an embodiment of the method to establish a secure channel between the owner and the software payload.

FIG. 3 depicts schematic diagram of an embodiment of the method 20 to establish a secure channel between the owner 1 and the software payload 2.

Alike traditional schemes, first, the payload 2 will be started by the owner and measured by the HW TEE. Before the payload starts, the HW TEE generates encryption key to protect its execution and, in addition, it measures its code and data when loading it in memory (e.g., measuring occurs by hashing its code and data). Just after, the payload 2 will normally send a liveness notification to the owner 1.

Preferably, from that point, the establishment of the secure channel according to this invention starts. In particular, in the following, it will be described a non-authenticated key-agreement protocol of the type of Elliptic Curve Diffie-Hellman, ECDH, protocol used for generating the session key by the software payload 2 and the owner 1.

As it can be seen from FIG. 3, the owner 1 generates 21 owner public data (ECDHOwnerPubElt) and NonceOwner, and sends 22 them to the payload 2. The owner also stores this NonceOwner for verifying afterwards the attestation.

Then, the payload 2 generates 23 ECDS key pair: KpubPayload/KprivPayload. The payload will also generate 24 payload public data (ECDHPayloadPubElt) and sign 25 this ECDHPayloadPubElt using KprivPayload resulting in ECDHPayloadPubEltSigned.

Next, the payload will compute 26 a hash of the KpubPayload further scrambling this hash output with the NonceOwner. In other words, computing:

XOR(hash(KpubPayload), NonceOwner)=AttestationNonce

This AttestationNonce will be sent 27 by the payload to the HW TEE for computing 28 the attestation. In a traditional workflow, the payload would send to the HW TEE the original NonceOwner sent by the user but, according to the invention, the AttestationNonce will be used instead. The skilled person would understand that the payload will also send specific parameters required by the specific HW TEE on a normal attestation workflow. Then, once received, the HW TEE 4 computes the attestation using at least this AttestationNonce thus giving rise to AttestationPayload-Report which is further sent back 29 to the payload 2.

Then, the payload receives it (or intercepts it), and forward it 30 to the owner together with KpubPayload, ECDH-PayloadPubElt, ECDHPayloadPubEltSigned.

The owner will receive it and reproduce 31 the mixing done by the payload but using the original NonceOwner it sent to the payload. Therefore, the owner computes:

XOR(hash(KpubPayload), NonceOwner)=Attestation-Nonce' and verifies 32 AttestationPayloadReport using AttestationNonce'. If the verification succeeds, the workflow continues. Otherwise, the attestation verification fails and the secure channel cannot be established. In addition, owner can be alerted somehow and, optionally, preventive measures may be taken such as aborting the connection with the payload.

In case the attestation can be verified, the owner 1 verifies 33 ECDHPayloadPubEltSigned using KpubPayload. If the verification of the signature succeeds, the workflow continues. Otherwise, the signature verification fails and the secure channel cannot be established.

Therefore, both the software payload 2 and the owner 1 separately generate 34 a shared secret using owner public data and payload public data, respectively. Hence, a direct secure channel is established 35 between them.

KPrivPayload is not limited to sign the ECDH Public Elements, it may be also used to sign any other data exchanged with the owner. In other embodiments, a Key Derivation Function may be used from the shared secret to have a specific signature key.

Advantageously, once the secure channel has been established, the owner is able to provision the very same attested payload with some secret(s).

Still, through the lifetime of the Payload, it may be necessary for the owner to have subsequent communications with it, for instance to perform secret(s) rotation.

Figure 4:
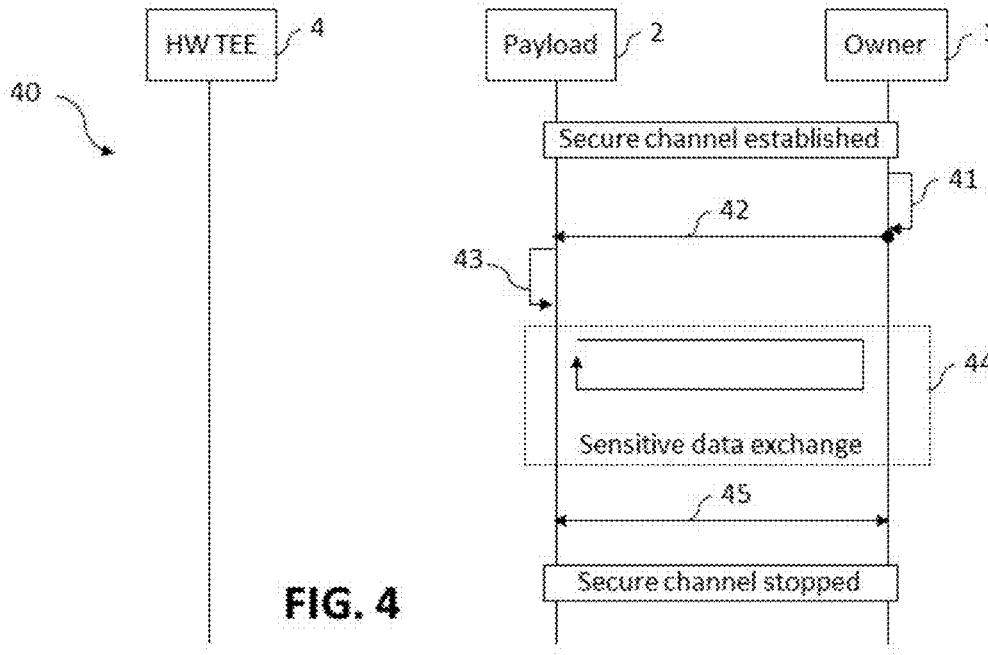
FIG. 4 This figure shows a schematic diagram of an embodiment of the method for providing authentication means.

Therefore, FIG. 4 depicts a schematic diagram of an embodiment of the method 40 for providing authentication means for the owner. Thanks to this, both parties are authenticated and therefore the secure channel may be re-opened on demand with the very same attested payload.

That is, once the secure channel has been established between the owner 1 and the software payload 2 running into the HW TEE 4 for instance, using the method 10, 20 according to FIG. 2 or 3, the owner 1 generates 41 an owner ECDSA key pair: public key (KpubOwner) and private key (KprivOwner), and then sends the KpubOwner to the payload.

The software payload receives KpubOwner and stores it 43 in a memory under the protection of the HW TEE. This persistent storage may be used either using the native sealing capabilities of the HW TEE or, alternatively, using any of the methods according to any of FIG. 6 or 7.

Then, both the owner 1 and the payload 2 can exchange 44 any information relevant to the application in a secure manner.

After this provisioning, since maintaining the secure channel through the whole lifetime of the payload would be too costly in term of network resources, any of the ends may require closing the secure channel 45 and the secure communication will stop.

Therefore, an authenticated secure channel backed up by attestation may be opened and closed as needed.

Figure 5:
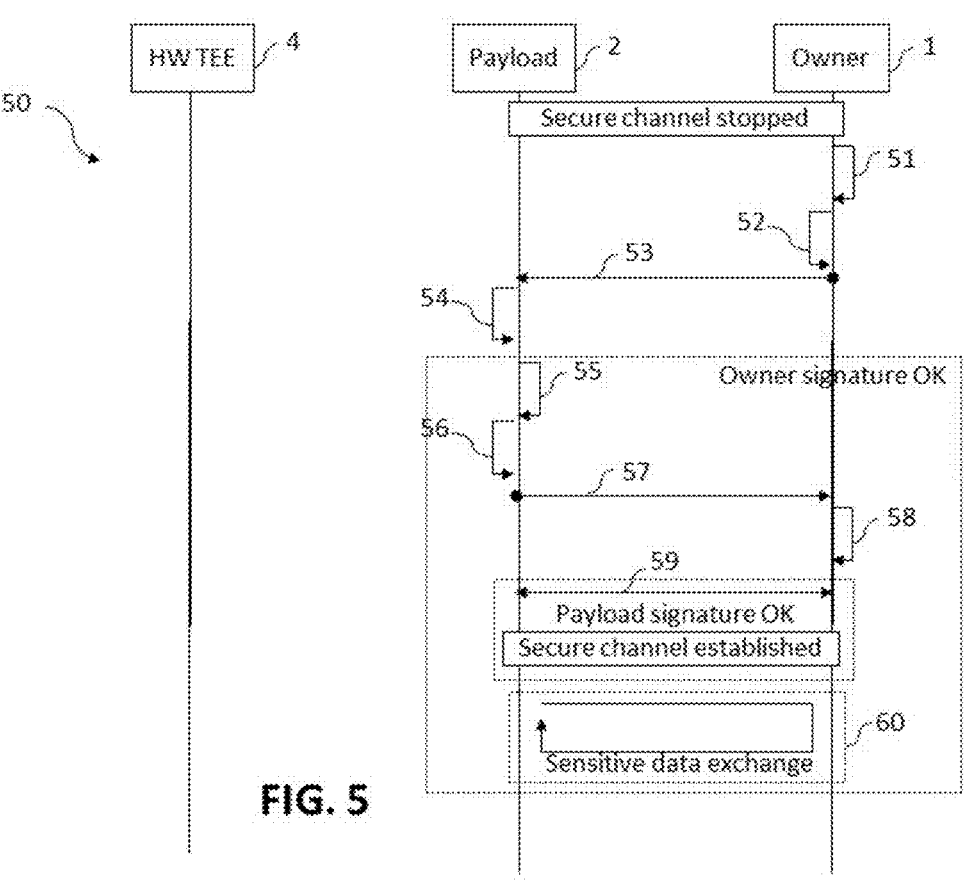
FIG. 5 This figure shows a schematic diagram of an embodiment of the method to re-establish a secure and authenticated channel between the owner and the software payload.

FIG. 5 depicts a schematic diagram of an embodiment of the method 50 to re-establish a secure and authenticated channel between the owner 1 and the software payload 2.

It will be assumed that a secure channel according to the method 10, 20 of the FIG. 2 or 3 was already established and, afterwards, stopped.

First, the owner 1 and the payload 2 perform a non-authenticated key-agreement protocol of the type of ECDH protocol for generating a session key. This session key may be different or similar to the session key already used for the establishment of the last secure channel.

Thus, the owner generates 51 owner public data (ECDHOwnerPubElt) and signs it 52 using KprivOwner thus resulting in ECDHOwnerPubEltSigned. Then, the owner sends 53 these ECDHOwnerPubElt and ECDHOwnerPubEltSigned to the payload 2.

The software payload retrieves the previously stored (e.g., in a HW TEE memory or the RAM of the payload) KpubOwner and verifies 54 ECDHOwnerPubEltSigned using KpubOwner.

If the owner signature is verified at payload's end, the workflow will continue. Otherwise, this verification will fail and the secure channel cannot be established.

If verified, the payload also generates 55 payload public data (ECDHPayloadPubElt) and retrieves KprivPayload for signing 56 this ECDHPayloadPubElt giving rise to ECDHPayloadPubEltSigned.

Then, the payload sends 57 ECDHPayloadPubElt and ECDHPayloadPubEltSigned to the owner which verifies 58, at its end, the ECDHPaylaodPubEltSigned using the KpubPayload.

If verified, both the payload 2 and the owner 1 will generate or compute 59 a (new) shared secret using ECDHOwnerPubElt and ECDHPayloadPubElt, respectively.

Finally, a secure channel is re-established 60 between the owner and the software payload running into the HW TEE allowing the owner 1 and the payload 2 exchanging any sensitive information in a secure manner.

Figure 6:
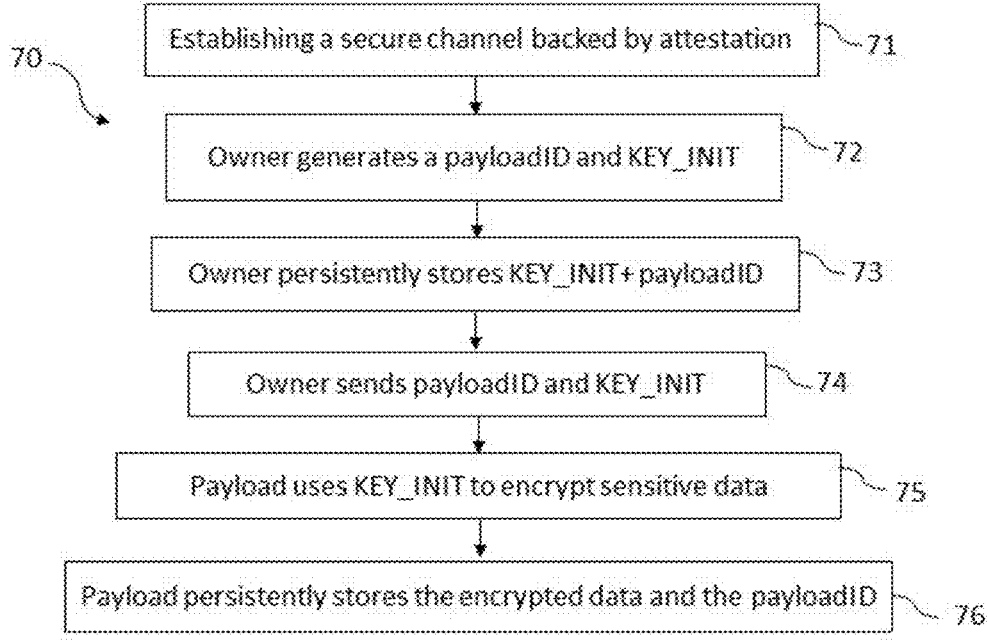
FIG. 6 This figure shows a schematic flowchart of a method to persistently store sensitive data by the payload.

FIG. 6 depicts a schematic flowchart of a method to persistently store sensitive data by the payload 2.

It is assumed that a secure channel has been established 71 between the owner 1 and the payload 2 itself when running into a HW TEE at the instance of a cloud service provider. Preferably, this secure channel is backed by the computation, by the HW TEE, of an attestation.

First, the owner generates 72 a payload identifier (PayloadID) using information shared from the payload during the establishment of the secure channel.

For instance, payloadID can be derived from the attestation information such as information relative to the HW TEE, the version of the payload, and/or the instantiation of the payload.

Then, the owner also generates 72 a key initiator (KEY_INIT) and persistently stores 73 (i.e., at the owner side) the key initiator associated to the payloadID. In a basic configuration, this KEY_INIT may be simply a symmetric key.

Then, the owner sends 74 these payloadID and key initiator to the payload. And the payload uses 75 the key initiator to encrypt data.

By doing so, the payload will be able to persistently store 76 the encrypted data and the payloadID in a memory under the protection of the HW TEE without relying on the native privacy mechanisms of the HW TEE.

The persistently stored sensitive data may be, for instance, KpubOwner and KprivPayload.

Therefore, when the payload need to retrieve this persistently stored data the following steps are taken:

the payload retrieves the stored payloadID and sends it to the owner;

the owner retrieves the key initiator associated to the received payload identifier and sends this key initiator to the payload; and the payload uses said key initiator to decrypt the persistently stored data.

After that, the payload will delete this key initiator.

Figure 7:
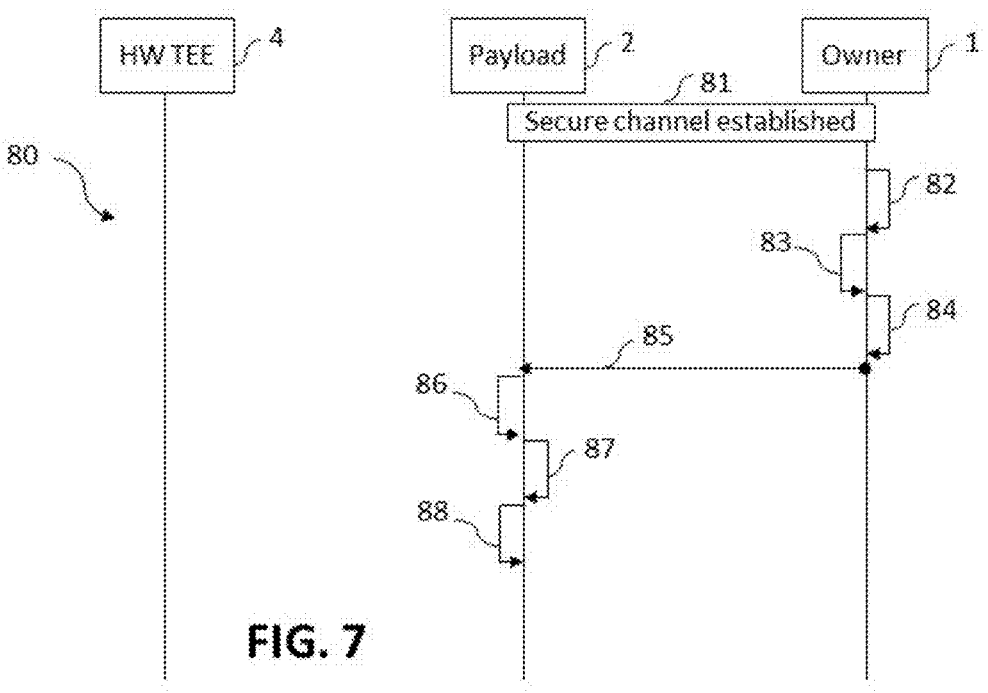
FIG. 7 This figure shows a schematic diagram of an embodiment of the method to persistently store sensitive data by the payload.

FIG. 7 depicts a preferred embodiment of a method 80 to persistently store sensitive data by the payload 2 without relying on the sealing capabilities of the HW TEE.

As mentioned, a secure channel has been established 81 between the owner 1 and the payload 2, for instance, backed by the computation, by the HW TEE, of an attestation.

The owner generates 82 PayloadID using information from the attestation. Then, the owner encrypts the payloadID using a first encryption key (PayloadIDEncKey) resulting in PayloadIDCiphered.

Then, the owner also generates 83 KEY_INIT and persistently stores 84 (i.e., at the owner side) the KEY_INIT associated to the payloadID.

Then, the owner sends 85 these payloadIDCiphered and KEY_INIT to the payload.

The payload passes 86 the KEY_INIT through a key derivation function, KDF, to generate a symmetric key (DataEncKey) for encrypting data, and (in addition) to generate a DataIntKey and Message Authentication Code (MAC) that allows the payload to subsequently check the integrity of the persistently stored data.

Finally, first the payload stores 87 the PayloadIDCiphered and further encrypts and MAC 88 the sensitive data.

Figure 8:
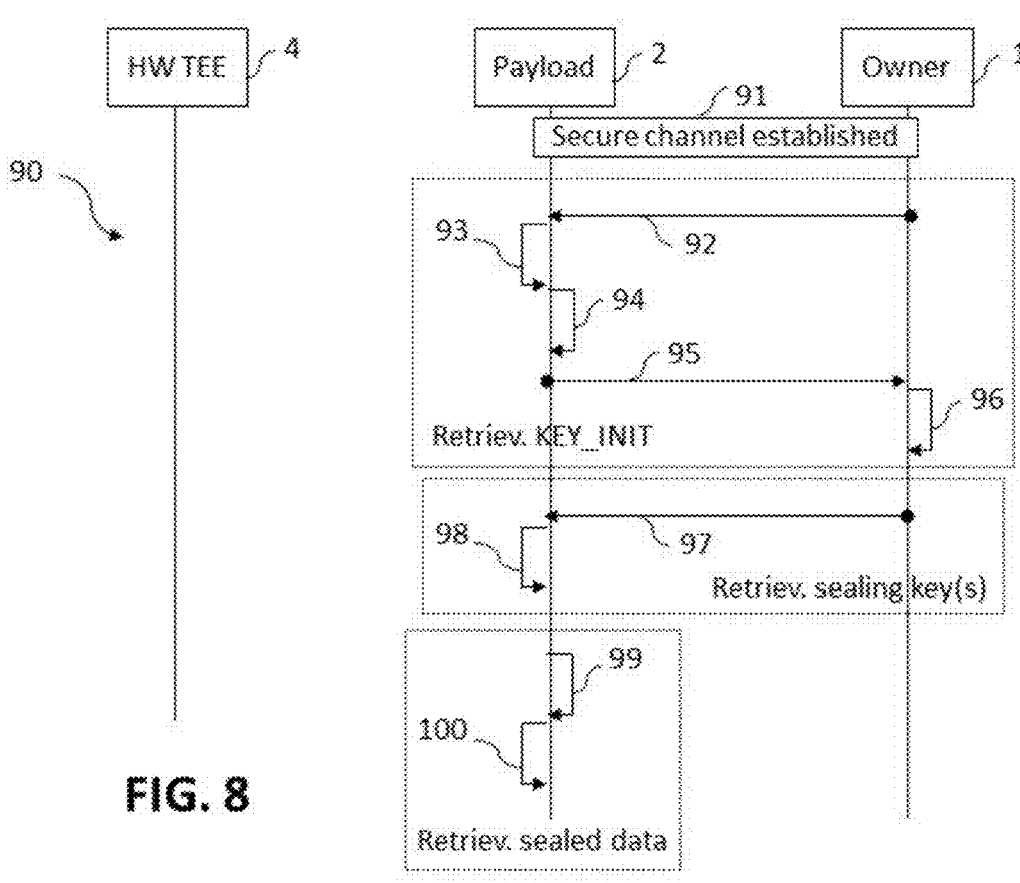
FIG. 8 This figure shows a schematic diagram of an embodiment of the method to retrieve sensitive data persistently stored by the payload.

FIG. 8 depicts a preferred embodiment of a method 90 to retrieve persistently stored sensitive data by the payload 2 as, for instance, any of the methods 70, 80 according to FIG. 6 or 7.

As mentioned, a secure channel has been established 91 between the owner 1 and the payload 2, for instance, backed by the computation, by the HW TEE, of an attestation.

Either at the instance of the payload or as part of a workflow, the owner 1 sends 92 PayloadIDEncKey to the payload 2. Then, firstly, the payload retrieves 93 the PayloadIDCiphered and further decrypts it using PayloadIDEncKey (=PayloadID). The payload will then send back to the owner the PayloadID in clear.

As an alternative implementation (not shown), the payload 2 may retrieve PayloadIDCiphered and send it to the owner which will decrypt it using PayloadIDEncKey thus also resulting on PayloadID in clear.

Referring back to FIG. 8, once the owner has the PayloadID in clear, it looks for any known PayloadID and, if found, retrieves 96 the associated KEY_INIT. Otherwise, if no PayloadID can be found, an error message may appear and the communications may end.

If KEY_INIT retrieval succeeds, the owner sends 97 KEY_INIT to the payload which will pass it through KDF to generate 98 DataEncKey for decrypting the sealed data, and to generate 98 DataIntKey to check the integrity of the persistently stored data.

Therefore, the payload retrieves 99 the sealed data and, accordingly, use 100 DataEncKey and DataIntKey to decrypt and check the integrity of this sealed data.

In terms of implementation, the skilled person shall understand that these processes may be delivered as a library that the developer can use. Preferably, these are done inside the payload because are secured by the HW TEE. There is no specific payload in charge.

The skilled person would recognize that these defined functionalities may be implemented as a library. Therefore, the developer can decide to use several payloads: one for the database, one for the webserver, one for the back-end, etc.

The invention claimed is:

1. A computer-implemented method to store data persistently by a software payload of an owner device, the method comprising the following steps:

establishing a secure channel between the owner device and the software payload itself when running into a hardware-based trusted executed environment, HW TEE, at the instance of a cloud service provider;

generating, by the owner device, a payload identifier using information shared from the payload during the establishment of the secure channel;

generating, by the owner device, a key initiator and persistently storing at the owner device the key initiator associated to the payload identifier;

sending, by the owner device, the payload identifier and the key initiator to the payload;

using the key initiator, by the payload, to encrypt data;

persistently storing, by the payload, the encrypted data and the payload identifier; and encrypting, by the owner device, the payload identifier using a first encryption key before sending it to the payload for its persistent storing in encrypted form.

2. The method according to claim 1, wherein either:

the key initiator is a symmetric key, or the key initiator is first passed through a key derivation function, KDF, by the payload, to generate a symmetric key that encrypts the data.

3. The method according to claim 1, wherein the key initiator is passed through a key derivation function, KDF, by the payload, to generate a Message Authentication Code (MAC) that allows the payload to subsequently check the integrity of the persistently stored data.

4. The method according to claim 1, wherein the secure channel between the owner device and the software payload is backed by a computation, by the HW TEE, of an attestation, and wherein the payload identifier is derived from the attestation information such as at least one of information relative to the HW TEE, the version of the payload, and the instantiation of the payload.

5. A computer-implemented method to retrieve data persistently stored by a payload of an owner device according to claim 1, the method comprising the following steps:

having established or re-establishing a secure channel between the owner device and the software payload itself when running into the HW TEE at the instance of a cloud service provider;

retrieving, by the payload, the stored payload identifier and sending it to the owner device;

retrieving, by the owner device, the key initiator associated to the received payload identifier;

sending, by the owner device, the key initiator to the payload; and using the key initiator, by the payload, to decrypt the persistently stored data.

6. The method according to claim 5, wherein the stored payload identifier had been previously encrypted by the owner device using the first encryption key, the method comprising the following steps:

sending, by the owner device, the first encryption key to the payload; and after being retrieved, decrypting, by the payload, the payload identifier and sending it to the owner device.

7. The method according to claim 5, wherein the stored payload identifier had been previously encrypted by the owner device using the first encryption key, the method comprising the following steps:

sending, by the payload, the encrypted payload identifier to the owner device;

decrypting, by the owner device, the payload identifier; and retrieving, by the owner device, the key initiator associated to the decrypted payload identifier.

8. A system for persistently storing data by a software payload of an owner device, the system comprising:

the owner device of the software payload configured to send the software payload to the a hardware-based trusted executed environment (HW TEE) for its execution, the software payload configured to run into the HW TEE, and the HW TEE operated by a cloud service provider;

wherein the owner device of the software payload and the software payload itself are configured to establish a secure channel between them when the payload is running into the HW TEE at the instance of the cloud service provider;

wherein the owner device is further configured to generate a payload identifier using information shared from the payload during the establishment of the secure channel;

generate a key initiator;

persistently store at the owner device the key initiator associated to the payload identifier;

send the payload identifier and the key initiator to the payload; and encrypt the payload identifier using a first encryption key before sending it to the payload for its persistent storing in encrypted form; and wherein the payload is further configured to use the key initiator to encrypt data; and persistently store the encrypted data and the payload identifier.

9. An owner device of a software payload for persistently storing data by the software payload, the owner device of the software payload configured to send the software payload to a hardware-based trusted executed environment (HW TEE) for its execution, wherein the owner device is further configured to establish a secure channel with the payload when the payload is running into the HW TEE at the instance of a cloud service provider;

generate a payload identifier using information shared from the payload during the establishment of the secure channel;

generate a key initiator;

persistently store at the owner device the key initiator associated to the payload identifier;

send the payload identifier and the key initiator to the payload which will use the key initiator to encrypt data and persistently store it and the payload identifier; and encrypt the payload identifier using a first encryption key before sending it to the payload for its persistent storing in encrypted form.

* * * * *